United States Patent
Schreieder et al.

[11] Patent Number: 6,007,869
[45] Date of Patent: Dec. 28, 1999

[54] PROCESS FOR PREPARING HIGHLY PURE SILICON GRANULES

[75] Inventors: Franz Schreieder, Tann, Germany; Hee Young Kim, Taejon, Rep. of Korea

[73] Assignee: Wacker-Chemie GmbH, Munich, Germany

[21] Appl. No.: 09/130,957

[22] Filed: Aug. 7, 1998

[30] Foreign Application Priority Data

Aug. 14, 1997 [DE] Germany ............................ 197 35 378

[51] Int. Cl.⁶ ...................................................... B05D 7/00
[52] U.S. Cl. .......................... 427/213; 427/215; 427/219; 427/553; 427/557; 427/255; 427/314
[58] Field of Search .................................. 427/212, 213, 427/215, 219, 553, 557, 255, 314

[56] References Cited

U.S. PATENT DOCUMENTS

| | | | |
|---|---|---|---|
| 3,012,862 | 12/1961 | Bertrand et al. | |
| 4,292,344 | 9/1981 | McHale | 427/45.1 |
| 4,416,913 | 11/1983 | Ingle et al. | 427/45.1 |
| 4,786,477 | 11/1988 | Yoon et al. | 422/145 |
| 4,900,411 | 2/1990 | Poong et al. | 204/157.43 |
| 5,077,028 | 12/1991 | Age. | |
| 5,260,538 | 11/1993 | Clary et al. | 219/10.491 |
| 5,374,413 | 12/1994 | Kim et al. | 423/349 |
| 5,382,412 | 1/1995 | Kim et al. | 422/142 |
| 5,798,137 | 8/1998 | Lord et al. | 427/213 |

FOREIGN PATENT DOCUMENTS

| | | |
|---|---|---|
| 2185981 | 3/1997 | Canada. |
| 19534922 | 2/1997 | Germany. |
| 4327308 | 4/1997 | Germany. |
| 03215310 | 9/1991 | Japan ............................ C01B 33/03 |
| 2185008 | 9/1986 | United Kingdom. |

OTHER PUBLICATIONS

Perry's Chemical Engineers' Handbook, 6th ed., Green ed., McGraw–Hill, New York, 1984.

Patent Abstracts of Japan, vol. 013, vol. 515 (C–655), & JP 01 208311 A (Mitsubishi Metal Corp.).

Patent Abstracts of Japan, vol. 0151 No. 488 (C–0893), & JP 03 215310 A (Osaka Titanium Co. Ltd.).

*Primary Examiner*—Diana Dudash
*Assistant Examiner*—Paul D. Strain
*Attorney, Agent, or Firm*—Collard & Roe, P.C.

[57] ABSTRACT

A process for preparing silicon granules with a chlorine contamination below 50 ppm by weight by deposition of elemental silicon on silicon particles in a fluidized-bed reactor. This reaction has a heating zone below a reaction zone. The silicon particles, in the heating zone, are fluidized by means of an inert silicon-free carrier gas to produce a fluidized bed and are heated by means of microwave energy. The silicon particles are reacted within the reaction zone, a reaction gas made up of a silicon source gas and the carrier gas. The average temperature of the reaction gas in the reaction zone, while the gas is perfusing the fluidized silicon particles, is maintained at less than 900° C. The average temperature of the fluidized silicon particles in the reaction zone, while they are being perfused by the reaction gas, is maintained at greater than 900° C.

12 Claims, 1 Drawing Sheet

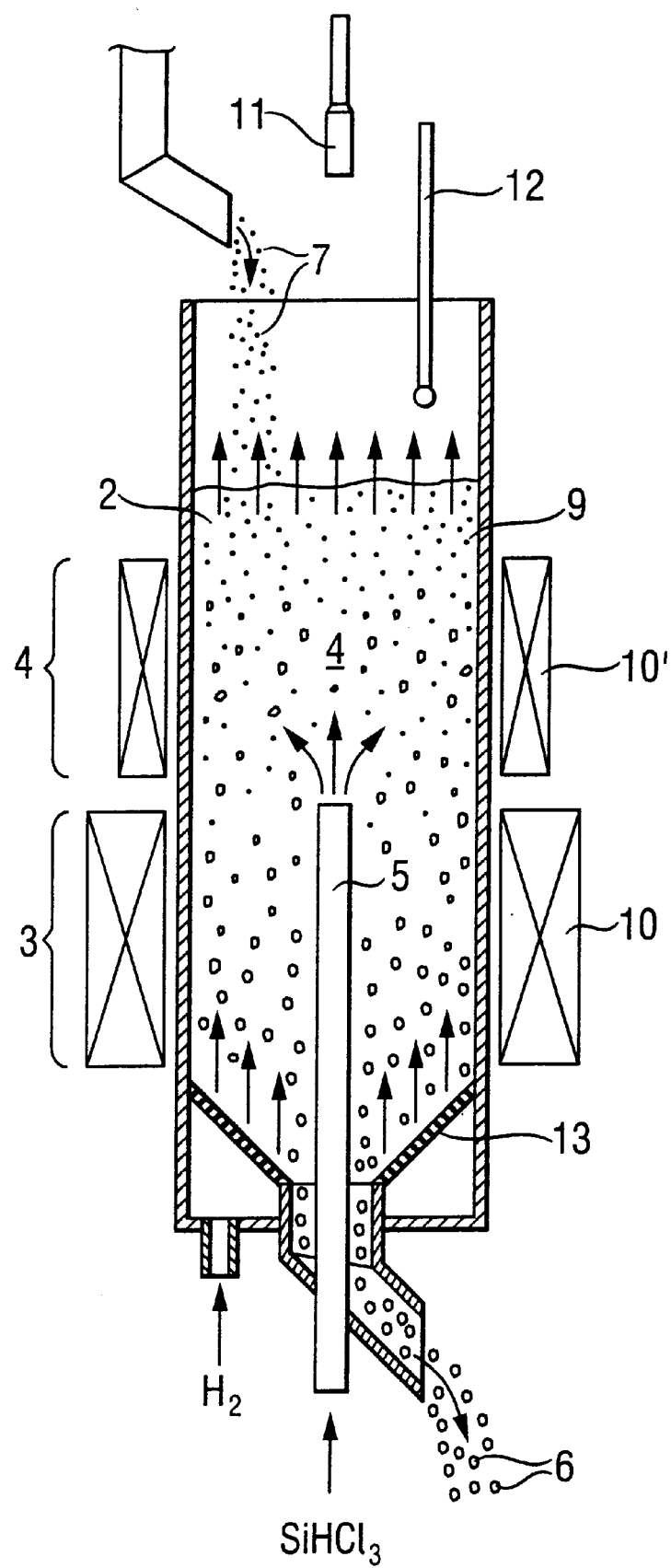

PROCESS FOR PREPARING HIGHLY PURE SILICON GRANULES

BACKGROUND OF THE INVENTION

1. Field of the Invention

The invention relates to a process for preparing highly pure polycrystalline silicon in a fluidized-bed reactor by thermal decomposition or reduction, with hydrogen, of a silicon source gas.

2. The Prior Art

Highly pure polycrystalline silicon (polysilicon) is a starting material for the fabrication of electronic components and solar cells. It is obtained by thermal decomposition or reduction, with hydrogen, of a silicon source gas. This process is known to those skilled in the art as chemical vapor deposition, CVD. Worldwide, polysilicon is produced mainly in so-called Siemens reactors. The chemical vapor deposition of elemental silicon in these CVD reactors takes place on silicon rods, so-called thin rods. These rods are heated to more than 1000° C. under a metal bell jar by means of electric current and are then exposed to a gas mixture consisting of hydrogen and a silicon source gas, for example trichlorosilane. As soon as the thin rods have grown to a certain diameter, the process sequence has to be interrupted, i.e. only batchwise operation rather than continuous operation is possible.

Most recently, attempts were made to obtain highly pure polycrystalline silicon as granules, hereinafter referred to as "silicon granules", in fluidized-bed reactors in the course of a continuous CVD process. Fluidized-bed reactors are preferred where solid surfaces are to be exposed extensively to a gaseous or vaporous compound. This will ensure an efficient operation. A gas mixture of a silicon source gas, for example trichlorosilane, and a silicon-free carrier gas, for example, hydrogen are known as the "reaction gas". If this reaction gas perfuses a fluidized bed comprising polysilicon particles, hereinafter referred to as "silicon particles", elemental silicon is deposited on the surface of these particles. These particles as a result, grow in size to produce granular polysilicon, hereinafter referred to as "silicon granules".

To provide the thermal conditions required for the CVD process, the fluidized-bed reactor is usually divided, via partitioning means, into two zones (See DE-43 27 308 C2):

1) a reaction zone within which the silicon source gas is deposited as polysilicon on the silicon particles at a specific reaction temperature, and 2) a heating zone within which a fraction of the silicon particles is fluidized by means of an inert, silicon-free carrier gas and is heated beyond the reaction temperature, for example by means of microwave energy.

In addition to the efficient operation of fluidized-bed reactors, a further advantage is that the polysilicon product is obtained in the form of granules which are approximately spherical. This free-flowing, granular polysilicon can immediately be transported and processed. On the other hand the rod-type product from the Siemens reactor first has to be crushed before it can be processed further, such as with the Czochralski process.

Notwithstanding these advantages, the use of a fluidized-bed reactor for preparing silicon granules often has drawbacks. In contrast to the polysilicon obtained by the Siemens process, the granules can be contaminated with chlorine, if chlorosilanes such as trichlorosilane are used as the silicon source gas. The contamination is trapped in the crystal lattice, and consequently cannot be removed even by annealing under a vacuum.

If there is further processing of the silicon granules by the Czochralski process, then a high chlorine contamination has adverse effects. For example there will be poor crystal quality of the single crystal pulled from the melt, due to the formation of gas bubbles in the silicon melt. There will also be concomitant splashing of the melt, and the formulation of chlorine-containing corrosive gases which destroy the pulling tool. These drawbacks are not observed with a chlorine contamination below 50 ppm by weight.

In principle there is no difference between the deposition of a gaseous silicon source gas on silicon rods in a Siemens reactor and on silicon particles in a fluidized-bed reactor. If the composition and the ratio of the reaction gas, the temperature of the silicon surfaces (rods or particles) and the reactor pressure are the same in both processes, there is the following result. The silicon granules from the fluidized-bed reactor nevertheless exhibit distinctly elevated chlorine contamination, compared with the rod-type polysilicon from the Siemens reactor.

U.S. Pat. No. 5,077,028 discloses that the chlorine contamination correlates inversely with the average deposition rate of elemental silicon on the silicon particles. Thus, as the deposition rate increases, the chlorine contamination decreases. According to this patent, a deposition rate greater than 0.4 μm/min at a temperature greater than 1000° C. is a prerequisite for a granular polysilicon product with a chlorine contamination below 20 ppm by weight.

However, operating a fluidized-bed reactor at a temperature of 1000° C. does result in substantial, undesirable deposition of elemental silicon on the insides of the reactor walls. This causes the termination of the CVD process. Such a high reactor temperature is virtually unachievable industrially and ensures neither reliable nor efficient operation.

SUMMARY OF THE INVENTION

It is therefore an object of the invention to provide a process for preparing silicon granules, which overcomes these drawbacks and, in particular, allows silicon granules to be prepared with a chlorine contamination below 50 ppm by weight.

It is a further object of the invention to provide unique conditions for a continuous CVD process to be carried out in fluidized-bed reactors.

This object is achieved by a process for preparing silicon granules with a chlorine contamination below 50 ppm by weight by deposition of elemental silicon on silicon particles in a fluidized-bed reactor, wherein the average temperature of the reaction gas in the reaction zone, is less than 900° C., while the gas is perfusing the fluidized silicon particles. In addition, the average temperature of the fluidized silicon particles in the reaction zone is preferably greater than 900° C., while they are being perfused by the reaction gas.

This is because it was found, surprisingly, that the chlorine contamination of the granular polysilicon product of this invention is below 50 ppm by weight. This will result if the average temperature of the reaction gas in the reaction zone, while the gas is perfusing the fluidized silicon particles, is less than 900° C., preferably less than 800° C.. Also it is necessary that the average temperature of the fluidized silicon particles in the reaction zone, while they are being perfused by the reaction gas, is greater than 900° C., and preferably greater than 1000° C..

It was also found that the deposition rate of elemental silicon on the silicon particles does not change significantly as a result of the temperature profile altered with respect to that in the prior art. This is based upon having the surface temperature of the silicon particles above 900° C., and preferably greater than 1000° C.. To increase the deposition rate, it is possible, in accordance with the process of the invention, to increase the pressure in the fluidized-bed reactor, preferably to 2 bar, and most preferably to 5 bar. The altered temperature profile proves advantageous not only to reduce chlorine contamination, but also to prevent deposition of elemental silicon on the reactor walls. The improved thermal configuration moreover leads to savings in energy.

The preferred process according to the invention thus results in the preparation of highly pure granular polysilicon in a fluidized-bed reactor. In this reactor, the temperature of the reaction gas is less than 900° C., preferably less than 800° C., and the temperature of the silicon particles is greater than 900° C., preferably greater than 1000° C..

In a prior-art fluidized-bed reactor, the reaction gas is preheated to about 300° C., and is uniformly distributed, by gas distribution means, over the entire reaction zone. Consequently, the reaction gas forms a homogeneous whole with the fluidized silicon particles which were previously heated, in the heating zone, to above 1000° C.. A thermal equilibrium between fluidized solid and reaction gas is rapidly established under these conditions. This can have the above noted disadvantages.

In the process and the apparatus of the invention, the reaction gas perfuses the reaction zone with the fluidized silicon particles, before a thermal equilibrium is able to establish itself.

The average temperature of the reaction gas perfusing the reaction zone can be controlled in various ways:

For example, reducing the fluidized-bed height avoids excessive contact between gas and solid. This reduces the residence time of the reaction gas in the reaction zone, without the deposition rate being significantly reduced.

A uniform gas distribution and consequently thermal equilibrium in the reaction zone is avoided as follows. A silicon source gas or a mixture of carrier gas and silicon source gas (reaction gas) are introduced through one or more tubular nozzles directly into the reaction zone. This method allows large gas bubbles to be generated at the top end of the reaction zone by thermal expansion, which enhance a heterogeneous nature of the fluidized bed within the reaction zone.

In addition it is possible to influence the average temperature of the reaction gas via the degree of fluidization. This is defined as the ratio of the average gas velocity, u, and the minimum gas velocity for fluidization, $u_{mf}$. The average temperature of the reaction gas decreases with the value of $u/u_{mf}$ at the reaction zone.

The novel process for preparing highly pure silicon granules can be applied to any conventional fluidized-bed reactor. The required operating conditions can be monitored on the basis of the average reaction gas temperature which is measured using suitable measuring equipment.

For example, the average temperature of the reaction gas in the reaction zone is measured by a thermometer. This thermometer has thermoelectric measuring means which are shielded in such a way that the shield can be passed only by reaction gas, but not by silicon particles. Preferably, however, the average reaction gas temperature above the reaction zone of the fluidized bed is measured at the off-gas outlet. The temperature of the silicon particles is measured with a conventional thermocouple or an infrared pyrometer.

BRIEF DESCRIPTION OF THE DRAWINGS

Other objects and features of the present invention become apparent from the following detailed description considered in connection with the accompanying drawing which discloses the embodiment of the present invention. It should be understood, however, that the drawing is designed for the purpose of illustration only not as a definition of the limits of the invention.

The figure diagrammatically shows fluidized-bed reaction suitable for carrying out the process of the invention.

DETAILED DESCRIPTION OF PREFERRED EMBODIMENTS

Turning now in detail to the drawing, which shows the reactor tube 1, made of metal, for example of stainless steel. Tube 1 is lined on the inside with highly pure quartz and on the outside is jacketed with insulating material 10 and 10'having low thermal conductivity, for example silica material. The bottom part of the fluidized bed 2 contains the heating zone 3, within which the silicon particles are fluidized by a silicon-free carrier gas, for example hydrogen or nitrogen, argon, helium and the mixtures thereof. These particles are heated by a heating means, for example microwave energy transmitted from a microwave generator. The preheated carrier gas flows through gas distribution means 13 into the heating zone of the reactor. The reaction zone 4 situated above the heating zone 3, is located above the tubular nozzle 5.

During operation of the reactor a continuous CVD process takes place on the fluidized silicon particles 9 and is established in the reaction zone 4. Into reaction zone 4 a preheated silicon source gas, for example trichlorosilane or a gas mixture of silicon source gas and silicon-free carrier gas flows through a tubular nozzle 5. Other silicon source gases include tetrachlorosilane, dichlorosilane and mixtures thereof with trichlorosilane. The average temperature of the fluidized silicon particles 9 in the reaction zone is mainly maintained by the heat transferred from heating zone 3. This reactor design has an improved thermal configuration with concomitant energy savings.

The average temperature of the silicon particles 9 in the reaction zone 4 was measured with an infrared pyrometer 11, and the average temperature of the reaction gas was measured with a thermometer 12. The thermoelectric measuring means of the thermometer 12 was shielded and disposed directly above the reaction zone 4. In the same proportion as silicon granules 6 were removed from the reactor as a product, silicon particles 7 were fed in at the top end of the reactor tube, in order to maintain the filling weight (fluidized-bed height) and the average particle size within the predefined range. The filling weight was maintained between 25 and 28 kg, the silicon particle size between 0.8 and 1.0 mm.

The surprising efficiency of the novel process is demonstrated by comprising comparative examples C1 and C2, with examples E1 to E6 (invention) in Table 1. The silicon source gas and the silicon-free carrier gas were injected into the reaction zone 4 not through the tubular nozzle 5, but through gas distribution means according to the prior art. This resulted in homogeneous mixing of reaction gas and fluidized silicon particles. Within the reaction zone, thermal equilibrium was obtained, such that the reaction gas and the silicon particles had the same temperature.

The experimental data in Table 1 (Comparative C1 and C2 versus Example E1 to E6) document that the chlorine contamination in the reaction product (silicon granules) is below 50 ppm by weight. This unexpected result in accordance with the process of the invention occurs if the average temperature of the reaction gas is below 900°, preferably less than 800° C.. The experimental data also document the advantageous effects of an elevated reactor pressure, preferably 2 bar and particular preferably 5 bar. These beneficial results occur both to reduce the chlorine contamination and on all process-optimizing operating parameters such as gas temperatures, particle temperatures and deposition rates. This provides efficient operation and energy savings due to low heat loss by convection, according to the invention. This is because as little energy as possible is transferred to the reaction gas flowing upward in the reaction zone.

Table 1 shows the efficiency of the process of the invention. The novel process and the apparatus for carrying out the process exhibit features which differ significantly from any previously known process and apparatus for preparing polycrystalline silicon granules.

of fluidization or the fluidized-bed height. In accordance with the process of the invention there is a reduction in the heat removed from the silicon particles by the reaction. This is due to the lower temperature of the reaction gas, which leads to further energy savings.

The invention thus provides a process for preparing highly pure polysilicon in a fluidized-bed reactor, the process being distinguished by an improved thermal configuration and efficient energy utilization in conjunction with reduced chlorine contamination of the reaction product. This reduced chlorine contamination ranges from 6 to 47 ppm by weight, preferably from 6 to 24 ppm by weight, and more preferably from 6 to 16 ppm by weight.

TABLE 1

|  | Comparative Example C1 | Comparative Example C2 | Example E1 | Example E2 | Example E3 | Example E4 | Example E5 | Example E6 |
| --- | --- | --- | --- | --- | --- | --- | --- | --- |
| $SiHCl_3$ input [mol/min] | 2.4 | 12 | 2.4 | 2.4 | 12 | 12 | 27.9 | 27.9 |
| $H_2$ input [mol/min] | 7.2 | 18 | 7.2 | 7.2 | 18 | 18 | 55.8 | 55.8 |
| Molar ratio $H_2/SiHCl_3$ | 3 | 1.5 | 3 | 3 | 1.5 | 1.5 | 2 | 2 |
| Pressure [bar] | 1.1 | 2 | 1.1 | 1.1 | 2 | 2 | 5 | 5 |
| Filling weight [kg] | 28 | 25 | 28 | 25 | 25 | 25 | 25 | 28 |
| Reaction gas temperature [° C.] | 1041 | 1040 | 894 | 619 | 780 | 674 | 491 | 788 |
| Silicon particle temperature [° C.] | 1050 | 1050 | 1050 | 1050 | 1050 | 958 | 934 | 1050 |
| Deposition rate [g/min] | 13.24 | 61.32 | 12.43 | 11.22 | 58.73 | 51.41 | 101.56 | 114.45 |
| Chlorine contamination [ppm by weight] | 97 | 89 | 47 | 15 | 24 | 14 | 6 | 16 |

The process enables the preparation of highly pure silicon granules at an average reaction gas temperature in the reaction zone which is less than that of the silicon particles, preferably less than 900° C., particularly preferably less than 800° C.. The problem of the deposition of elemental silicon on the reactor walls because of intensive heating does not occur with the process of the invention. The reaction gas temperature in the reaction zone can range from 491° C. to 894° C., preferably from 4910 to 788° C., more preferably 491° C. to 674° C and most preferably from 491° to 619° C..

In contrast to processes of the prior art, uniform mixing, which is intensive contact between reaction gas and silicon particles, is prevented by the process of the invention. Even though the average temperature of the reaction gas in the reaction zone is distinctly less than that of the prior art, the deposition rate is not decreased. This beneficial deposition rate results as long as the average surface temperature of the silicon particles is sufficiently high, preferably greater than 900° C., particularly preferably greater than 1000° C..

Heating of the fluidized silicon particles is effected in a simple manner, for example by microwave energy in the heating zone, which is situated below the reaction zone and is in direct contact therewith. By virtue of the simple mixing of the fluidized silicon particles of the reaction zone with the hotter silicon particles from the heating zone, the claimed process permits efficient utilization of the heating energy. The average temperature of the reaction gas is controlled by previously known methods such as, for example, the degree While a few embodiments of the present invention have been shown and described, it is to be understood that many changes and modifications may be made thereunto without departing from the spirit and scope of the invention as defined in the appended claims.

What it is claimed:

1. A process for preparing silicon granules with a chlorine contamination below 50 ppm by weight by deposition of elemental silicon on silicon particles in a fluidized bed reactor comprising:

establishing in a fluidized bed reactor having a heating zone below a reaction zone, a fluidized bed of silicon particles; and fluidizing said silicon particles, in the heating zone, by means of an inert silicon-free carrier gas passing upwardly, first through the heating zone and then through the reaction zone, to produce said fluidized bed of silicon particles in the reactor;

introducing a reaction gas, comprising a silicon source gas and a carrier gas through at least one tubular nozzle, directly into the reaction zone of the fluidized bed reactor;

heating said silicon particles in the heating zone by means of microwave energy;

reacting the silicon particles in the reaction zone with said reaction gas and said reaction gas passing upwardly through said fluidized silicon particles, and maintaining an average temperature of the reaction gas in the reaction zone at from 491° C. to 894° C..

2. The process as claimed in claim 1, wherein the average temperature of the fluidized silicon particles in the reaction zone is greater than 900° C., while said particles are being perfused by the reaction gas.

3. The process as claimed in claim 1, comprising controlling the temperature of the reaction gas by controlling fluidized bed height.

4. The process as claimed in claim 1, comprising controlling the temperature of the reaction gas by controlling degree of fluidization at the reaction zone, defined as the ratio of average gas velocity above the reaction zone, u, and minimum gas velocity leading to fluidization, $u_{mf}$.

5. The process as claimed in claim 1, wherein the silicon source gas is selected from the group consisting of tetrachlorosilane, trichlorosilane, dichlorosilane and mixtures thereof.

6. The process as claimed in claim 1, wherein the silicon-free carrier gas is selected from the group consisting of hydrogen, nitrogen, argon, helium and mixtures thereof.

7. The process as claimed in claim 1, wherein the temperature of the reaction gas in reaction zone ranges from 491° C. to 788° C..

8. The process as claimed in claim 1, wherein the temperature of the reaction gas in reaction zone ranges from 491° C. to 674° C..

9. The process as claimed in claim 1, wherein the temperature of the reaction gas in reaction zone ranges from 491° C. to 619° C.

10. The process as claimed in claim 1, wherein the chlorine contamination ranges from 6 to 47 ppm by weight.

11. The process as claimed in claim 1, wherein the chlorine contamination ranges from 6 to 24 ppm by weight.

12. The process as claimed in claim 1, wherein the chlorine contamination ranges from 6 to 16 ppm by weight.

* * * * *